United States Patent
Allnatt

(12) 
(10) Patent No.: US 6,193,930 B1
(45) Date of Patent: Feb. 27, 2001

(54) BRAZING ALLOY

(75) Inventor: Norman Allnatt, Swansea (GB)

(73) Assignee: Wall Colmonoy Limited (GB)

( * ) Notice: Subject to any disclaimer, the term of this patent is extended or adjusted under 35 U.S.C. 154(b) by 0 days.

(21) Appl. No.: 09/084,660

(22) Filed: May 26, 1998

(30) Foreign Application Priority Data

May 23, 1997 (GB) .................................................. 9710711
Mar. 6, 1998 (GB) .................................................. 9804763

(51) Int. Cl.[7] ............................. C22C 1/04; C22C 19/03; C22C 19/05
(52) U.S. Cl. ........................... 420/442; 420/441; 420/90; 75/245; 75/254
(58) Field of Search .................................... 420/442, 441, 420/590; 75/245, 254; 148/675

(56) References Cited

U.S. PATENT DOCUMENTS 3,914,867 * 10/1975 Manning et al. .................... 420/442

FOREIGN PATENT DOCUMENTS

1052050 * 2/1989 (JP) ...................................... 420/442

* cited by examiner

Primary Examiner—Deborah Yee
(74) Attorney, Agent, or Firm—Rader, Fishman & Grauer PLLC

(57) ABSTRACT

Two or more metal or alloy parts (such as catalytic convertor parts) are brazed by melting a homogeneous nickel-based brazing filler alloy containing boron in an amount of not more than 0.2% by weight; converting the molten alloy to a powder of uniform composition; and using the powder as a brazing filler alloy to braze a metal or alloy part to a further metal or alloy part. Typically, the parts are of stainless steel with a relatively high aluminum content; at least one of the parts is generally in the form of a thin foil.

19 Claims, 2 Drawing Sheets

BRAZING ALLOY

BACKGROUND OF THE INVENTION

The present invention is concerned with a method of brazing together two or more metal or alloy parts.

Brazing is a process in which a metal or alloy of lower melting range is used to join parts made from an alloy of metal of a higher melting range.

Nickel-based brazing filler alloys are well known and are used to join parts of alloys from stainless steel to much more refractory alloys such as Nimonics, Inconels and the like. These brazing filler alloys are commonly supplied as powders. They melt generally in the range from 880° C. to 1200° C., individual alloy compositions having solidus-liquidus ranges determined by melting point depressants such as phosphorus, boron and silicon. Combinations of boron and silicon are used in several alloys such as BS 1845 HTN1, HTN2 etc, the boron content being relatively high and in excess of 1%. These are reliably manufactured by charging to a melting furnace a formulation having the desired final composition which, when molten, is converted directly to powder by atomizing to provide appropriate melting characteristics without blending of the powder.

GB-A-1547117 discloses nickel-based brazing alloys for use in brazing or diffusion welding of metal or alloy joints, of, for example, carbon steel, nickel-based alloys, copper alloys, and stainless steel. The brazing alloys disclosed contain boron in an amount of 0.6% to 1.8% by weight. If the brazing alloys of GB-A-1547117 were to be used for the purpose of brazing thin foils of stainless steel, erosion of the relevant joint can result.

GB-A-2279363 discloses a metallic coating material for use in protecting the surface of a substrate of a copper-based alloy against high temperature corrosion and erosion. The document, however, does not teach or suggest the use of the metallic material as a brazing filler for brazing a metal or alloy part to another metal or alloy part. The high proportion (0.5% to 4.0%) of boron present, would in any case, make the material unsuitable for brazing together thin stainless steel parts, for the reasons outlined above.

The highest melting nickel-based brazing filler alloys are those which use only silicon as the melting point depressant, e.g. BS1845 HTN5, mid-range composition of 19% chromium, 10.5% silicon, balance nickel. They offer particularly useful properties in the brazing of parts for very high temperature applications. However their inherently higher brazing temperatures can impair the selection of optimum brazing conditions for a particular choice of parent metal and design of component, or increase furnace maintenance costs.

In order to overcome this problem, it is known to blend to these alloys up to 10% of a nickel-based brazing filler alloy of a lower melting range to facilitate the onset of the brazing process, especially where brazing alloy flow in to be on parent metal substrates having higher refractory surfaces. Such substrates may be, for example, iron alloys containing chromium and aluminum as used in the manufacture of metallic catalyst supports for cars, and also in honeycomb seals in gas turbines.

Conveniently this brazing filler alloy of a lower melting range contains boron as at least one of the melting point depressants present. After assisting early braze flow, the boron then diffuses into the substrates leaving the final re-melt temperature of the brazing filler alloy unaffected by any further depression in melting temperature which might otherwise be caused by the presence of boron. A convenient level of boron in the lower melting range alloy is 1% since this then results in a level of 0.1% in the resultant blend. The blend route to such a low boron content has been formerly accepted as the normal method for several reasons.

These include simple modification of a standard powder at the end of routine manufacture, in this case to BS1845 HTN5, to produce relatively small quantities of a special grade by blending. The manufacturing control required to produce a 1% boron alloy powder to within a given proportionate tolerance is also less demanding than a direct melting route producing 0.1%. In practice a blend constituent may be chemically analyzed before blending and blend ratios modified to compensate for normal tolerances of manufacture. For example, if the lower melting powder was found to contain 0.9% instead of 1% boron then the blend ratio could be modified from 10% to 11% to give the same final content of 0.1% boron. The same low melting range powder composition may be manufactured for other purposes, for example to blend with powders of other compositions, or for use as a product in its own right in the braze hardfacing process for which it was originally conceived.

For these various reasons it has become standard industry practice to manufacture brazing filler alloys with low boron contents in the typical range 0.05–0.15% by blending.

However, a disadvantage of blending two nickel based brazing filler alloy powders of different compositions is that these compositional differences from point to point will persist after melting in certain applications. In particular, when the brazing filler alloy is spread extremely thinly, which can for example involve essentially monolayers of powder particles, depending on the application. It can be shown in these circumstances that small scale statistical variations in homogeneity will lead to considerable localized variations in composition—in this case of boron concentration. Thus, the resultant film of motion filler metal immediately after melting is so thin that mixing does not occur on a scale sufficient to remove these compositional differences. This in turn leads to differences in brazing performances and therefore differences in brazing conditions and results. Sometimes the results can be very deleterious, with erosion of thin foils in the region of the brazed joint.

OBJECTS OF THE INVENTION

It is therefore an object of the present invention to provide an improved method of brazing two or more metal or alloy parts, with less deleterious compositional differences in the brazed joint.

It is a further object of the invention to provide an improved method of brazing together metal or alloy parts, at least one of which being thin and/or of stainless steel.

It is also an object of the present invention to provide a homogeneous brazing filler alloy having a relatively low boron concentration which may be used to effectively braze together thin stainless steel parts.

It is a still further object of the present invention to provide a homogeneous powdered brazing filler alloy having a uniform composition which produces a substantially homogeneous brazed joint between metal or alloy parts.

SUMMARY OF THE INVENTION

These and other objects are solved according to the invention, in a first aspect, which comprises:

(a) melting ingredients such as to provide a homogeneous molten nickel-based brazing filler alloy containing boron in an amount of not more than 0.2% by weight of the molten alloy;

(b) converting the molten alloy to a powder of uniform composition;

(c) interposing the resulting powder between a first metal or alloy part and a second metal or alloy part; and (d) melting the powder between the first part and the second part so as to braze the first part to the second part.

DESCRIPTION OF PREFERRED EMBODIMENTS

Typically, the brazing filler alloy is used to join one or more parts of stainless steel with a relatively high aluminum content (such as an alloy containing up to about 10% aluminum, up to 20% chromium, with the balance being iron, incidental ingredients and impurities). Such alloys are conventionally used for purposes such as metallic catalyst supports for vehicles.

A high aluminum content in one or both of the metal or alloy parts to be brazed can restrict the brazing filler alloy flow, because stable superficial oxides form during heating in vacuum, which inhibit brazing. A boron concentration of not more than 0.2% by weight is sufficient to allow the boron to interact with and substantially break-up the superficial oxides which form. This amount of boron also assists flow in the presence of such oxides.

It is disadvantageous to employ excess boron, because the excess can interact with thin foils of metals or alloys being brazed. This can lead to a non-uniform and weakened bond between the brazed parts. For this reason the amount present is not more than approximately 0.2% by weight. However, it is more preferred that the amount of boron should not exceed 0.15% by weight.

Preferably, the brazing filler alloy contains 12 to 20% chromium, and/or 8 to 12% silicon, the balance consisting essentially of boron, nickel, incidental ingredients and impurities. A particularly preferred brazing filler alloy contains about 17% chromium and about 9.7% silicon.

Preferably, the brazing filler alloy is substantially free of copper and/or manganese. That is, it is preferred that the amount of copper is less than 0.2% and the amount of manganese is preferably less than 0.4% by weight.

The brazing filler alloy is preferably solidified as a powder (in step (b) of the method according to the invention) by a process comprising conventional gas atomization.

The macro melting and solidification behaviour of such brazing filler alloy powders is not significantly different from that of blended powders, but their micro compositional uniformity and hence micro melting and solidification behaviour are significantly improved. When, for example, the brazing filler alloy is used for a substantially linear joint between a thin foil of metal or alloy and a further part of metal or alloy (typically at a rate of about 0.1 milligram per millimeter length of one or more of the parts being brazed) the resulting brazed joint is significantly more homogeneous than the joints achieved by the prior art "blending" process. By "thin foil", I mean herein a thickness of less than 100 microns (typically about 50 microns or even less).

BRIEF DESCRIPTION OF THE DRAWINGS

An illustrative embodiment of the method according to the invention will now be described, with reference to the accompanying drawings, in which.

DETAILED DESCRIPTION OF PREFERRED EMBODIMENT

Figure 1:
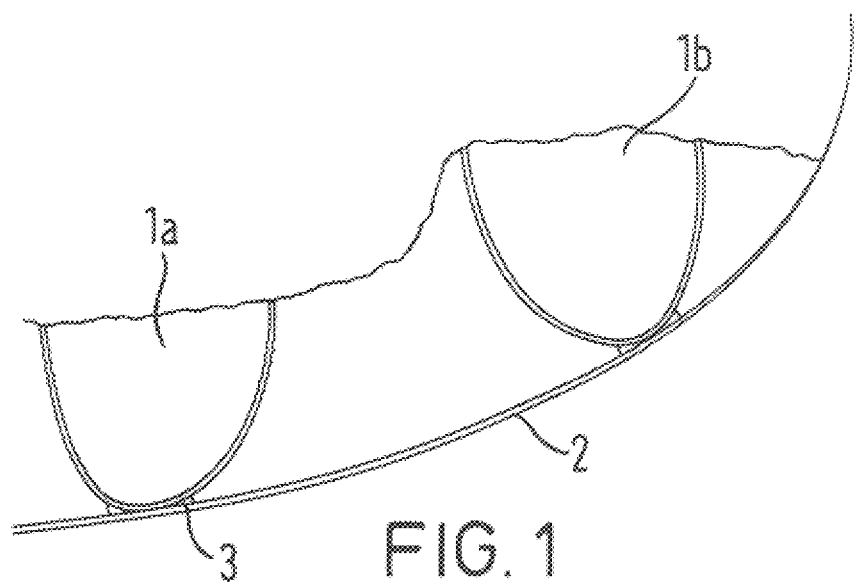
FIG. 1 is a schematic illustration showing joining of metal parts according to the invention.

Referring to FIG. 1, elements 1a and 1b forming part of a catalytic convertor are brazed to a curved metal surface 2 using as brazing filler alloy a thin layer of powder 3, made according to steps (a) and (b) outlined above. This brazing filler alloy will be referred to subsequently as "pre-melted", in order to distinguish from the prior art process in which the ingredients are mixed together during brazing.

FIG. 1 shows the desirability of uniformity of the boron content in a thin layer of brazing filler alloy.

Figure 2:
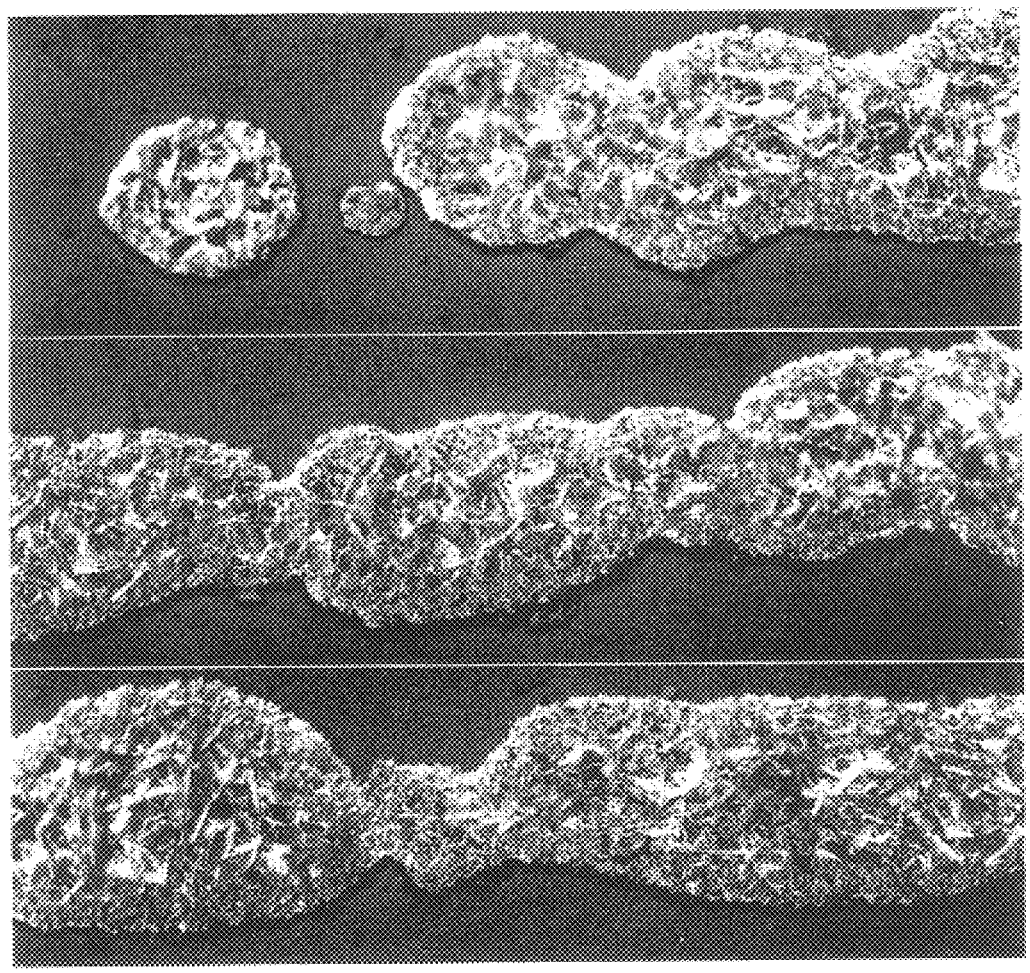
FIG. 2 is a micrograph showing the spread of a (prior art) blend powder braze deposit.
Figure 3:
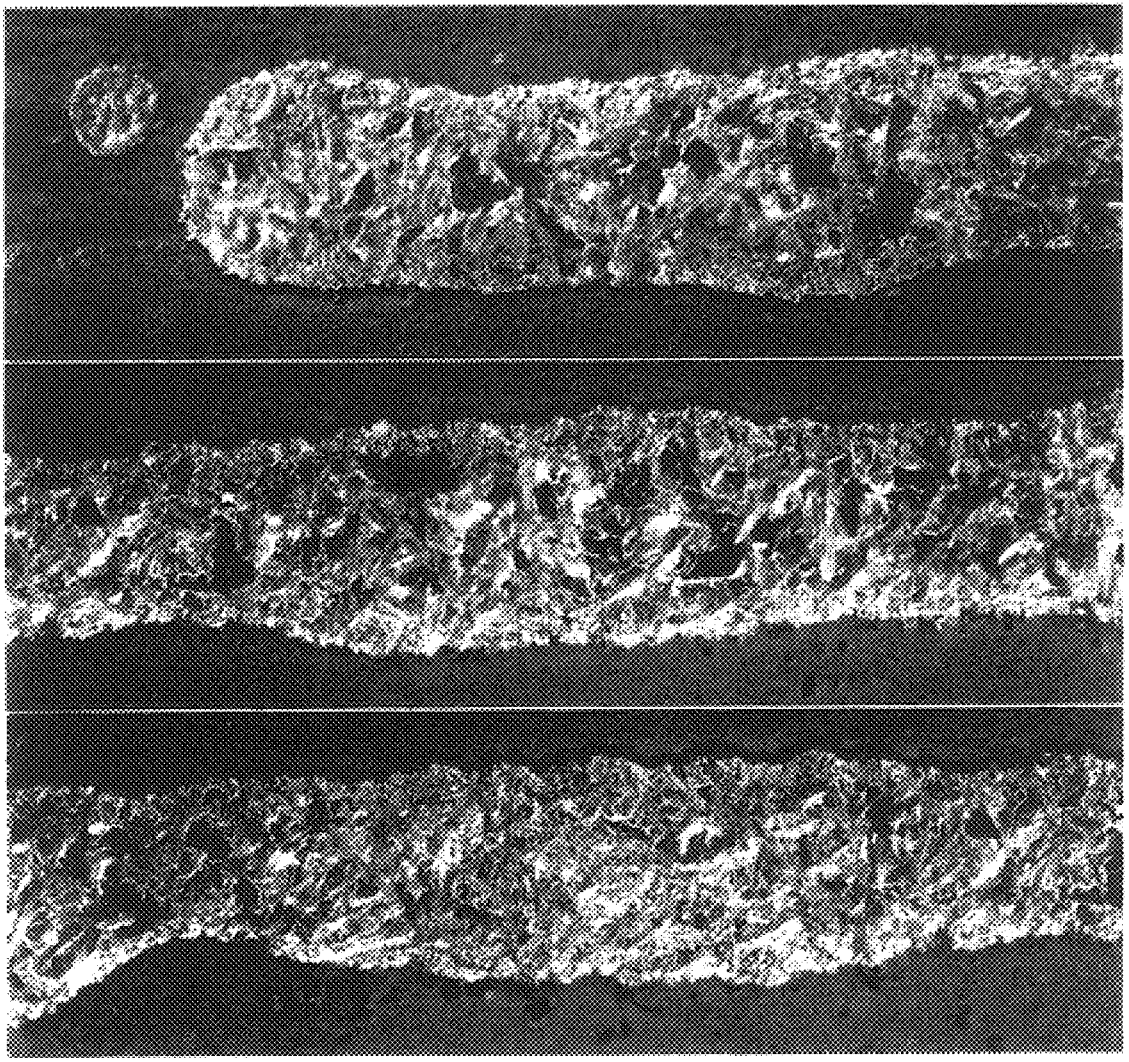
FIG. 3 is a micrograph showing the spread of a pre-melted braze deposit obtained in a method according to the invention.

The present invention will now be illustrated by description of the following exemplary embodiment (in which FIGS. 2 and 3 are described in more detail).

EXAMPLE 1

A parent metal was selected on which brazing filler alloy flow is sensitive to such filler alloy compositional variations; for example, 50 micron thick foil of a composition of approx. 12% chromium, 6% aluminum, the balance being iron. The relatively high aluminum content greatly restricts brazing filler alloy flow because stable superficial oxides form during vacuum brazing which inhibit wetting. Boron was therefore present in an amount to assist the flow.

The samples of foil used in these tests were marked as to rolling direction, degreased and abraded in the length direction with 400 mesh silicon carbide paper to give a clean and reproducible surface condition. The foil was then cut into 30 mm square coupons.

The brazing filler alloy selected had a composition of 17% chromium, 9.7% silicon, 0.1% boron, the balance being nickel.

A first brazing filler alloy was manufactured by mixing 90% of a powdered nickel-based alloy containing 19% chromium, 10.5% silicon and 10% of a powdered nickel-based alloy containing 2.5% silicon and 1% boron. A 20 g sample was used in this experiment; the required tumbling time to produce a uniform blend of the two constituents was 3 minutes.

A second brazing filler alloy was manufactured by pre-melting all constituents in a furnace to directly achieve a composition of 17% chromium and 9.7% silicon and 0.1% boron.

In both cases the balance of the composition was nickel and small quantities of normally occurring impurities.

All powders were produced from liquid melts by conventional gas atomization, the powder then being screened to give a size fraction for these tests of largely 45 microns to 106 microns.

In order to stimulate the very small brazing filler alloy description rates typical of an industrial process, it was necessary to develop an appropriate application method for applying the brazing filler alloy powder. It was found that narrow lines of a suitable adhesive could be drawn on the parent metal foil using a draftsman's pen of the type which has an adjustable claw tip. Brazing filler alloy powder was then gently sifted on to this line of adhesive and the excess blown away, leaving a line of brazing filler alloy particles adhering to the foil. When the adhesive was dry, the brazing filler alloy powder deposit was ready for brazing. The direction of application of the line of brazing filler alloy was along the rolling direction, that is parallel with the subsequent direction of abrasion when the foil was prepared.

This technique of two stage application in which the uptake of powder is limited by the location and amount of pre-applied adhesive is known among brazing experts as "pepperpotting".

In order to achieve an essential monolayer of powder particles it was necessary to select binder characteristics with some care. A solution of a proprietary resin in a slow drying solvent (ethyl lactate) was adjusted to a viscosity of 800 cps to suit the particular type of pen in use. The resin was a type carefully selected to be fully fugitive—that is, on heating in vacuum during the early part of the subsequent vacuum brazing cycle, it completely volatilizes, leaving powder particles cohering in place by the weak forces known to exist between small particles and a substrate.

A long drying solvent was necessary in order that the particles were drawn into intimate contact with the substrate as drying proceeded.

It is known from prior investigations that this intimate contact is necessary in order that the filler alloy may ultimately wet the type of substrate when the temperature during heating in vacuum reaches and extends the melting range of the brazing filler alloy.

It was found by tare weighing, reweighing when the samples were dry, and measurement of the length of the lines of brazing filler alloy deposited that the deposition rate was approximately 0.1 mg per mm length. In order to obtain two comparable samples of the blended powder and of the pre-melted powder, the deposition technique was repeated until two samples were obtained, one each of the blended and pre-melted powders, having deposition weights/mm within 10% of each other.

The samples were then brazed according to the following conventional vacuum brazing cycle:

Evacuate to less than $1 \times 10^{-1}$ mbar

Heat to 1000° C. at a rate of 15° C./min

Hold at 1000° C. for 10 min

Heat to 1170° C. at a rate of 10° C./min

Hold for 5 min

Cool in vacuum to 900° C.

Inert gas cool to 100° C. and discharge.

The vacuum brazing furnace used was of a type used for brazing difficult to wet parent metals; the furnace was prepared for this trial by high temperature bake out to meet stringent conditions of internal cleanliness and in-leakage, as will be understood by experts in this field. After brazing the samples, microphotographs were taken at 75 times magnification.

FIG. 2 shows that the spread of the brazing filler alloy is irregular, corresponding to the scale of the statistical variations predicted for the random variation in boron content. Approximately 10% of the total length exhibits abnormally restricted flow, while a less easily calculable proportion shows greater flow than average.

FIG. 3 shows no such variation, and because the only difference between the specimen of FIG. 2 and that of FIG. 3 was the state of aggregation of boron (i.e. blended or pre-melted), it was concluded that this difference was responsible for the differences in uniformity of flow.

Although the pepperpotting technique used for sample preparation did not feasibly permit deposition rates below 0.1 mgram/mm, it is possible that the associated industrial process may be improved to achieve yet lower deposition rates with benefits including but not limited to, economy in the use of brazing filler alloys. At such lower deposition rates a statistical analysis shows that the random variations between boron contents in such deposits of blended brazing filler alloy powder will become greater. The use of pre-melted brazing filler alloy powder eliminates such variations and permits full advantage to be taken of such industrial process improvements.

I claim:

1. A method of making a nickel-based brazing filler alloy for brazing a first part of a first metal or alloy to a second part of a second metal or alloy, which method comprises:
   (a) melting ingredients such as to provide a homogeneous molten nickel-based brazing filler alloy containing boron in an amount of 0.05% to 0.2% by weight of said molten alloy; and
   (b) converting said molten alloy to a powder suitable for use as a brazing filler alloy.

2. A powdered nickel-based brazing filler alloy for brazing a first part of a first metal or alloy to a second part of a second metal or alloy, which may be the same as said first metal or alloy or different thereto, said powdered brazing filler alloy being produced before use in a brazing operation by:
   (a) melting ingredients such as to provide a molten nickel-based brazing filler alloy containing boron in an amount of 0.05 to 0.2% by weight of said molten alloy; and
   (b) converting said molten alloy to a powder of uniform composition.

3. A powdered nickel-based brazing filler alloy created before use in a brazing operation, which has a substantially uniform composition and consists essentially of the following:
   (a) boron in an amount of 0.05 to 0.2% by weight;
   (b) chromium in an amount of 12 to 20% by weight;
   (c) silicon in an amount of 8 to 12% by weight;
   (d) substantially no copper;
   (e) substantially no manganese; and
   (f) the balance being nickel, incidental ingredients and impurities.

4. A brazing filler alloy as recited in claim 2, wherein said brazing filler alloy contains boron in an amount of 0.05% to 0.15% by weight.

5. A brazing filler alloy as recited in claim 2, wherein said brazing filler alloy contains chromium in an amount of 12% to 20% by weight.

6. A brazing alloy as recited in claim 4, wherein said brazing filler alloy contains about 17% by weight of chromium.

7. A brazing alloy as recited in claim 2, wherein said brazing filler alloy contains silicon in an amount of 8% to 12% by weight.

8. A brazing alloy as recited in claim 6, wherein said brazing filler alloy contains about 9.7% by weight of silicon.

9. A brazing alloy as recited in claim 2, wherein said brazing filler alloy contains substantially no copper.

10. A brazing alloy as recited in claim 2, wherein said brazing filler alloy contains substantially no manganese.

11. A brazing filler alloy as recited in claim 3, wherein said brazing filler alloy contains boron in an amount of 0.05% to 0.15% by weight.

12. A brazing alloy as recited in claim 3, wherein said brazing filler alloy contains about 17% by weight of chromium.

13. A brazing alloy as recited in claim 3, wherein said brazing filler alloy contains about 9.7% by weight of silicon.

14. A nickel based powdered brazing filler alloy for brazing a first part of a first metal or alloy to a second part of a second metal or alloy, which may be the same as said first metal alloy or different thereto, said brazing filler alloy being of a uniform composition and formed before use in a brazing operation, and comprising:
   boron in an amount of 0.05 to 0.2% by weight;
   chromium in an amount of 12 to 20% by weight; and
   silicon in an amount of 8 to 12% by weight.

15. A brazing alloy as recited in claim 14, wherein said alloy contains substantially no copper and substantially no manganese.

16. A brazing alloy as recited in claim 14, wherein the balance of said alloy is nickel, incidental ingredients and impurities.

17. A brazing filler alloy as recited in claim 13, wherein said brazing filler alloy contains boron in an amount of 0.05% to 0.15% by weight.

18. A brazing alloy as recited in claim 13, wherein said brazing filler alloy contains about 17% by weight of chromium.

19. A brazing alloy as recited in claim 13, wherein said brazing filler alloy contains about 9.7% by weight of silicon.

* * * * *